United States Patent [19]
Klingen

[11] 3,949,224
[45] Apr. 6, 1976

[54] OPTICAL MODULATION SYSTEM AND FREQUENCY DOUBLER USING ORGANO-SUBSTITUTED CARBORANES

[75] Inventor: Theodore J. Klingen, Oxford, Miss.
[73] Assignee: The University of Mississippi, University, Miss.
[22] Filed: July 17, 1974
[21] Appl. No.: 489,111

[52] U.S. Cl. .............. 250/216; 250/225; 250/229; 332/7.51; 350/150; 350/160 R
[51] Int. Cl.² .......................................... G02F 1/03
[58] Field of Search .......... 250/225, 229, 199, 216; 350/147, 150, 159, 160 R; 332/2, 7.51

[56] References Cited
UNITED STATES PATENTS

| | | | |
|---|---|---|---|
| 2,560,430 | 7/1951 | Friend............................ | 250/225 X |
| 3,069,973 | 12/1962 | Ames................................ | 350/150 |
| 3,711,180 | 1/1973 | Klingen et al...................... | 350/150 |
| 3,740,118 | 6/1973 | Land et al.......................... | 350/150 |
| 3,747,022 | 7/1973 | Nanamatsu et al................ | 332/7.51 |
| 3,796,479 | 3/1974 | Helfrich et al..................... | 350/150 |

Primary Examiner—Alfred E. Smith
Assistant Examiner—E. R. LaRoche
Attorney, Agent, or Firm—Laurence, Stokes & Neilan

[57] ABSTRACT

An optical modulation system and frequency doubler utilizes an organo-substituted carborane cell sandwiched between a pair of crossed polarizers. Light passing through the cell is rotated an amount determined by an electrical control signal applied across the cell. Hence the amount of light passing through the system is modulated by the control signal. When the cell is modulated by an AC control signal, light modulation occurs at twice the AC control signal frequency since the cell has two possible orientations which permit maximum light transfer. The modulated light is directed upon an electro-optical transducer which produces an electrical output proportional to the intensity of the light impinging thereupon.

22 Claims, 4 Drawing Figures

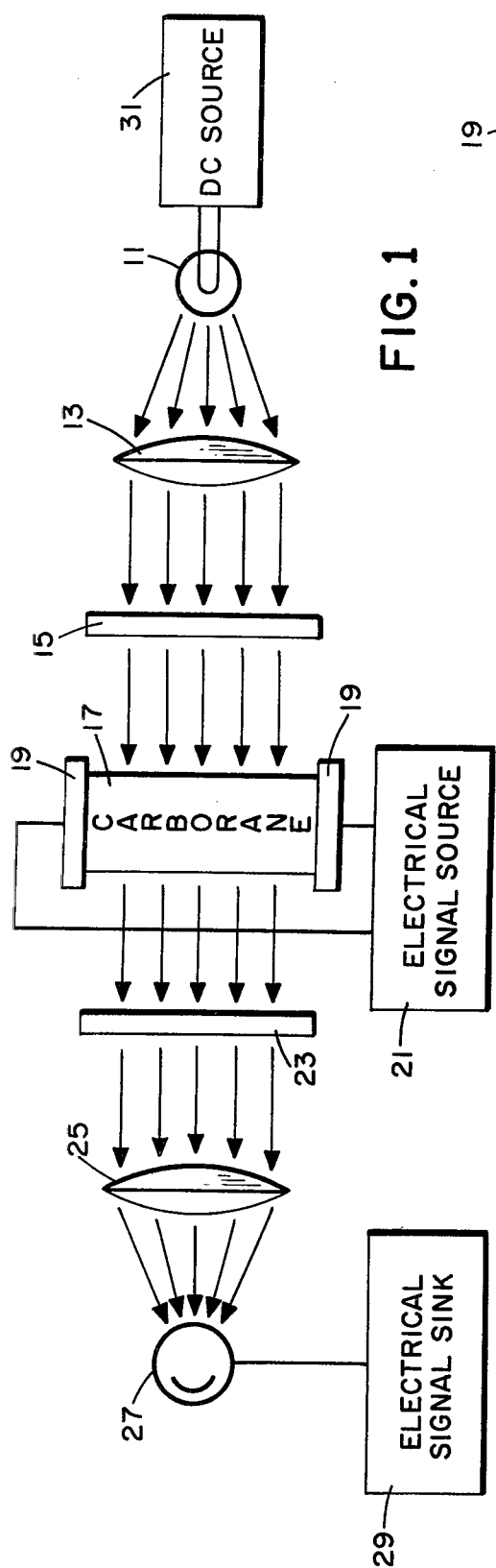
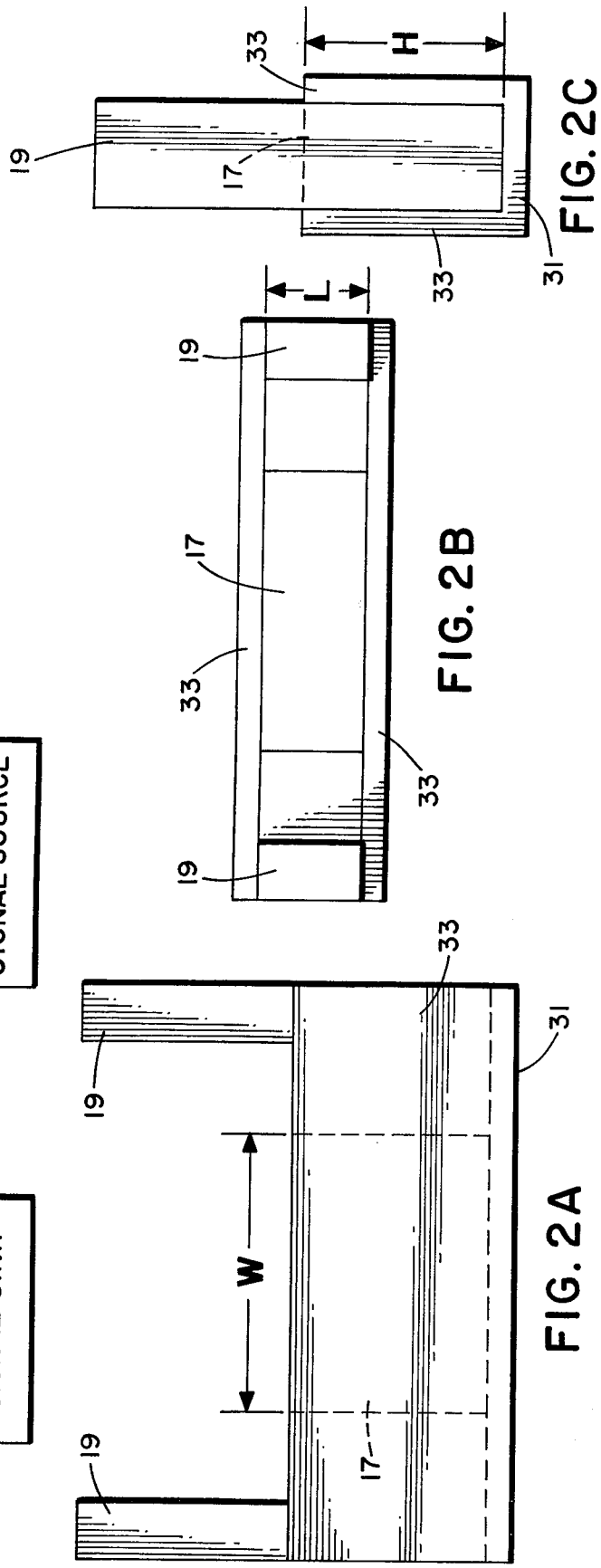

OPTICAL MODULATION SYSTEM AND FREQUENCY DOUBLER USING ORGANO-SUBSTITUTED CARBORANES

BACKGROUND OF THE INVENTION

This invention is directed to optical modulation and frequency doubler systems using organo-substituted carboranes.

The electro-optical properties of organo-substituted carboranes for use in optical switching and video devices has been described in U.S. Pat. No. 3,711,180, issued on Jan. 16, 1973 to T. J. Klingen, applicant of the present disclosure, and J. R. Wright.

It has been discovered that highly purified monomers of the compounds 1,2-dimethyl-o-carborane, 1-n-propyl-o-carborane, 1-allyl-o-carborane, 1-phenyl-o-carborane are directly applicable in optical switching, modulation, and video systems as well as the 1-ethyl-o-carborane and 1-vinyl-o-carborane monomers disclosed in U.S. Pat. No. 3,711,180.

Therefore, it is an object of this invention to provide new and improved optical modulation and frequency doubler systems.

It is also an object to apply the electro-optical properties of organo-substituted carboranes to optical modulation and frequency doubler systems.

It is a further object of this invention to apply new monomers in optical switching, modulation, and frequency doubler systems.

SUMMARY OF THE INVENTION

In accordance with principles of this invention, new and improved optical modulation and frequency doubler systems are provided. The present invention utilizes an organo-substituted carborane cell sandwiched between a pair of crossed polarizers. The cell comprises an organo-substituted compound sandwiched between a pair of parallel transparent plates and bounded on opposing ends by a pair of electrodes. Light passing through the cell is rotated an amount determined by an electrical control signal applied across the cell electrodes. Thus the amount of light which passes through the crossed polarizers, the parallel transparent plates and the organo-substituted compound is modulated by the electrical control signal. When the cell is modulated by an AC control signal, light modulation occurs at twice the AC control signal frequency since the cell has two possible orientations which permit maximum light transfer. The modulated light is directed upon an electro-optical transducer which produces an electrical output proportional to the intensity of the light impinging thereupon.

BRIEF DESCRIPTION OF THE DRAWINGS

The foregoing objects and many of the attendant advantages of this invention will become more readily appreciated as the same becomes better understood from the following detailed description when taken in conjunction with the accompanying drawings wherein:

FIG. 1 is a cross-sectional diagram illustrating an optical modulator and frequency doubler formed in accordance with the present invention; and FIG. 2A is a front view diagram illustrating an organo-substituted carborane cell formed for use in the present invention;

FIG. 2B is the top view diagram of the carborane cell of FIG. 2A; and FIG. 2C is the side view diagram of the carborane cell of FIG. 2A.

DESCRIPTION OF THE PREFERRED EMBODIMENT

A featured element in the optical modulation and frequency doubling devices of the present invention is the organo-substituted carborane cell. A brief description of organo-substituted carboranes suitable for use in these cells is provided in U.S. Pat. No. 3,711,180, issued on Jan. 16, 1973 to T. J. Klingen, applicant of the present disclosure, and J. R. Wright. It has been discovered that highly purified monomers of the compounds 1,2-dimethyl-o-carborane, 1-n-propyl-o-carborane, 1-allyl-o-carborane, 1-phenyl-o-carborane are directly applicable in optical switching, modulation, and video systems as well as the 1-ethyl-o-carborane and 1-vinyl-o-carborane monomers disclosed in U.S. Pat. No. 3,711,180.

Turning now to a more specific description of the physical operation of the embodiment of the invention illustrated in FIG. 1, it will be understood by those skilled in the art that crossed polarizers normally will not pass light because each polarizer cuts out the light component passed by the other polarizer. On the other hand, if the light passed by one polarizer is rotated prior to reaching the second polarizer, the second polarizer will pass some or all of the light depending upon the degree of rotation. Modulation of the degree of rotation thereby results in modulation of the light intensity passing through the crossed polarizers.

In operation of the invention, light rays are generated by light source 11 and are focused into parallel rays by a first focusing lens 13. The parallel rays thus developed are polarized by a cross polarizer front element 15 and are passed through a carborane cell 17 wherein they are rotated an amount controlled by voltage levels impressed upon a pair of cell electrodes 19 by a time-varying electrical signal source 21 in a matter hereinafter to be described. The light rays passing from the carborane cell 17 strike the cross polarizer rear element 23 and are passed therethrough in an intensity relating to the degree of rotation occurring in the carborane cell 17. Thereafter the light rays are focused by a second focusing lens 25 to impinge upon an electro-optical transducer 27. An electrical signal is generated by the transducer 27, the electrical signal varying in amplitude as the amount of light impinging thereupon. As will be described hereinafter, a frequency doubling occurs through the action of the carborane cell 17 thereby causing the signal generated by the electro-optical transducer 27 to be equal to twice the frequency of the AC signal source 21. The signal generated by the transducer 27 is passed to an electrical signal sink 29 where it is further processed according to particular application requirements. For example, the signal sink 29 may be an oscilloscope for system performance monitoring, or a signal amplifier or other such interfacing circuit that may be required for the desired signal processing to follow.

The light source 11 used in the present invention may be an incandescent lamp powered preferably from a DC source 31 as shown. The light source may also be a laser and the invention may be used to introduce information via modulation upon a laser beam.

The focusing lenses 13 and 25 are not an absolute necessity to the operation of the present invention but they do enhance overall system performance by directing light rays advantageously.

The cross polarizer elements 15 and 23, having been described in considerable detail in U.S. Pat. No. 3,711,180, will not be further described herein. However, it is noted that for application in the present invention each polarizer element is orientated at 45° with respect to the electrical signal path between the electrodes 19 orientated carborane cell 17 as well as being orinetated at 90° with respect to each other. This arrangement has been found to give the maximum Kerr effect.

The construction of a carborane cell suitable for use in the present invention is shown in FIGS. 2A, 2B, and 2C. The front view of the cell, shown in FIG. 2A, is the view presented to light rays impinging upon the cell according to FIG. 1. The cell comprises a pair of electrodes 19 secured within a rectangular U-shaped glass channel member 31 at the opposing ends thereof. The sides of the channel member 31 form a pair of transparent windows 33. A suitable highly purified monomer selected from the above-described compounds fills the volume bounded on the bottom and two sides by the glass channel member 31 and at the ends by the electrodes 19.

The size of the cell may vary according to particular application requirements. Two cell sizes were used in a working model of the invention. The first had a light path length L of ¼ inch, a width W of ¼ inch and a height H of ½ inch. The second had a light path length L of ½ inch, a width W of ⅛ inch and a height H of ½ inch. Both models employed glass of approximately 2mm thickness and used copper for electrodes 19. Translucent material other than glass may be used for channel member 31 and conductive material other than copper may be used for electrodes 19.

Referring now again to FIG. 1, it is noted that the cell size chosen for a particular application affects the signal level parameters of the associated electrical signal source 21. For example, it was found that for a cell size of L=½ inch, W=⅛ inch, and H=½ inch a nominal voltage level from signal source 21 produced satisfactory modulation performance. On the other hand, when the cell size was changed to L=¼ inch, W=¼ inch and H=½ inch it was found that a nominal voltage level of 33 volts was required. The voltage levels were found not to be critical and significant variation about the nominal levels also produced satisfactory results.

Since the organo-substituted carborane has two possible rotational orientations which permit light to be transmitted through the cross polarizer elements 15 and 23, the light modulation frequency produced an AC signal from electrical signal source 21 is equal to twice the electrical frequency generated by the source 21. Thus when in the working model AC signals of 60 Hz to 1200 Hz were applied to the carborane cell electrodes 19 light modulation occurred at frequencies from 120 Hz to 2400 Hz. Much higher modulation frequencies may also be used. By using an oscilloscope for the electrical signal sink 29 it has been determined that the response time of the light modulation scheme of FIG. 1 is in the order of 20 nanoseconds. Thus, the embodiment of the present invention as shown in FIG. 1 permits the encoding of light or laser beams at very high information rates. Square wave signals may be used to modulate the light beam in a switching or ON-OFF mode. d The modulated light rays are focused by the second focusing lens 25 upon the electro-optical transducer 27 which converts the modulated light rays into modulated electrical signals. A photomultiplier was used in a working model of the invention, but other light-to-electricity tranducers known in the art may also be employed.

For demonstration purposes a Techtronics 7000 series oscilloscope and camera were used as the electrical signal sink 29. An oppropriate signal sink may be chosed for each application. For example, if the electrical signal source 21 is an audio generator, the signal sink 29 may be an audio amplifier. On the other hand, if the electrical signal source 21 is used to digitally encode a light or laser beam, the signal sink 29 may be chosen as a computer or MODEM interfacing circuit.

It will be appreciated by those skilled in the art and others from the foregoing description of the preferred embodiment of the invention that the invention provides both light modulation and electrical frequency doubling devices. While the invention has been particularly shown and described with reference to the preferred embodiments thereof, it will be understood by those skilled in the art that the foregoing and other changes in form and details may be made therein without departing from the spirit and scope of the invention.

The embodiments of the invention in which exclusive property or privilege is claimed are defined as follows:

1. An optical modulation device comprising:
    a cross polarizer having two substantially parallel polarizing elements; and
    an organo-substituted carborane cell sandwiched between said two polarizing elements, said cell having
        a pair of spaced-apart transparent windows, said windows being substantially parallel to said two polarizing elements;
        a pair of spaced-apart electrodes sandwiched between said pair of windows; and
        an organo-substituted carborane material contained within a volume bounded on two ends by said pair of electrodes and on two sides by said pair of windows.

2. An optical modulation device as claimed in claim 1 wherein said organo-substituted carbornae is 1,2-dimethyl-o-carborane.

3. An optical modulation device as claimed in claim 1 wherein said organo-substituted carborane is 1-n-propyl-o-carborane.

4. An optical modulation device as claimed in claim 1 wherein said organo-substituted carborane is 1-allyl-o-carborane.

5. An optical device as claimed in claim 1 wherein said pair of windows are formed as the sides of a U-shaped retangular channel member.

6. An optical modulation device as claimed in claim 1 wherein said pair of electrodes are positioned substantially parallel to each other and at substantially 45° with respect to the plane of polarization of each of said two polarizing elements.

7. An optical modulation device as claimed in claim 1 wherein said organo-substituted carbornae is 1-phenyl-o-carborane.

8. An optical modulation device as claimed in claim 1 wherein said pair of electrodes are formed of copper.

9. A modulation system comprising
    means for generating light rays;

a cross polarizer having two substantially parallel polarizing elements in the path of said light rays;

means for generating a time-varying electrical modulation signal;

organo-substituted carborane means sandwiched between said two polarizing elements, said means having a pair of spaced-apart transparent windows, said windows being substantially parallel to said two polarizing elements; a pair of spaced-apart electrodes sandwiched between said pair of windows; and an organo-substituted carborane contained within a volume bounded on two ends by said pair of electrodes and on two sides by said pair of windows; said carborane means responsive to said modulation signal means for rotating light rays passing therethrough in degrees related to the modulation signal levels of said modulation signal means; and electro-optical means in the path of light rays transmitted through said cross polarizer and said organo-substituted carborane means for generating an electrical signal proportional in amplitude to the intensity of light impinging thereupon.

10. The modulation system according to claim 9 further comprising means between said light generating means and said cross polarizer for focusing the generated light rays into parallel rays; and means between said cross polarizer and said electro-optical means for focusing the light rays transmitted through said cross polarizer upon said electro-optical means.

11. The modulation system according to claim 9 wherein said light generating means includes a laser.

12. The modulation system according to claim 9 wherein said electro-optical means includes a photomultiplier.

13. The modulation system according to claim 9 wherein said organo-substituted carborane is 1-phenyl-o-carborane.

14. The modulation system according to claim 9 wherein said organo-substituted carborane is 1,2-dimethyl-o-carborane.

15. The modulation system according to claim 9 wherein said organo-substituted carborane is 1-n-propyl-o-carborane.

16. The modulation system according to claim 9 wherein said organo-substituted carborane is 1-allyl-o-carborane.

17. The modulation system according to claim 9 wherein said organo-substituted carborane is 1-ethyl-o-carbornae.

18. The modulation system according to claim 9 wherein said organo-substituted carborane is 1-vinyl-o-carborane.

19. A frequency doubler comprising means for generating light rays;

electro-optical means in the path of the generated light rays for generating an electrical signal proportional in amplitude to the intensity of light impinging thereupon;

means for generating an AC time-varying electrical signal; and means including a cross polarizer having two substantially parallel polarizing elements, and an organo-substituted carborane cell sandwiched between said two polarizing elements and having a pair of spaced-apart transparent windows, said windows being substantially parallel to said two polarizing elements; a pair of spaced-apart electrodes sandwiched between said pair of windows; and an organo-substituted carborane contained within a volume bounded on two ends by said pair of electrodes and on two sides by said pair of windows; said means responsive to said AC electrical signal generating means, interposing said light generating means and said electro-optical means for modulating the intensity of light transmitted therebetween at a rate equal to twice the rate of the AC time-varying electrical signal generated by said AC electrical signal generated means.

20. The frequency doubler according to claim 19 wherein said pair of electrodes are positioned substantially parallel to each other and at substantially 45° with respect to the plane of polarization of each of said two polarizing elements.

21. The frequency doubler of claim 19 further comprising means between said light generating means and said cross polarizer for focusing the generated light rays into parallel rays; and means between said cross polarizer and said electro-optical means for focusing the light rays transmitted through said cross polarizer upon said electro-optical means.

22. The frequency doubler according to claim 21 wherein said electro-optical means includes a photomultiplier.

* * * * *